United States Patent Office 3,725,090
Patented Apr. 3, 1973

3,725,090
METHOD OF PREPARING A LIQUID MIXTURE FOR THE PRODUCTION OF FOUNDRY CORES AND MOULDS
Abram Moiseevich Lyass, Sharikopodshipnikovskaya ulitsa 2, kv. 146; Lidia Dorofeevna Snulova, Sharikopodshipnikovskaya ulitsa 2, kv. 125; Pavel Afanasievich Borsuk, Nizhne-Pervomaiskaya ulitsa 59, kv. 125; Anna Ivanovna Tsyruleva, Serpovpereulok 3/5, kv. 8; and Sergei Dmitrievich Teplyakov, Seleznevskaya ulitsa 13, kv. 3, all of Moscow, U.S.S.R.
No Drawing. Filed July 27, 1971, Ser. No. 166,646
Int. Cl. B28b 7/34
U.S. Cl. 106—38.35
9 Claims

ABSTRACT OF THE DISCLOSURE

A method of producing foundry molds and cores comprising the steps of preparing a mixture consisting of foundry sand, pulverulent calcium sulfate hemihydrate ($\alpha$-modification), a component selected from the group consisting of alkali metal, alkaline earth metal and ammonium lignosulfonates, mixtures thereof and thermopolymers thereof, a foaming agent and water. Molds and cores are formed from said mixture and allowed to harden in air.

BACKGROUND

Field of invention

The present invention relates to foundry practices and, more particularly, to methods of preparing self-hardening liquid mixtures for the production of foundry cores and molds.

Prior art

In foundry practice, one known method for preparing molding mixtures involves the use of quartz sand, talcum, asbestos, plaster, a foaming agent in the form of aqueous solutions of alkylsulphonates, and water.

The foaming agent is added to the mixture in order to increase its permeability to gas. Inasmuch as this mixture consists mainly of plaster, it is necessary to add a considerable amount of water for the complete hydration of the plaster and making the mixture fluid so as to enable pouring it into core boxes and molds. The surplus moisture is removed by thermal drying in order to prevent boiling and to avoid the defects resulting therefrom during the filling of the molds. This method is shown, for example, in United Kingdom Pat. No. 696,169 granted to the Aluminum Company of America, U.S.A.

Moreover, other methods are known involving self-hardening liquid mixtures consisting of a sand filler, a soluble glass binder, a foaming agent, and an additive in the form of materials containing dicalcium silicate and insuring the self-hardening of the mixture of air (see for example French Pat. No. 1,342,529, A. M. Lyass and P. A. Borsuk).

In spite of the advantages of the above-described mixtures containing soluble glass (the pouring of the mixture into core boxes and patterns without subsequent compaction, and the self-hardening of the same in air), they lack strength at elevated temperatures and are comparatively difficult to knock out after molten metal has been poured thereinto.

Liquid self-hardening mixtures have also been prepared from materials containing the salts of lignosulfonic acids as a binder and hexavalent chromium compounds as hardening agents. This made it possible to produce mixtures which reproduced shapes with a high degree of accuracy, hardened in air throughout the entire volume thereof, were readily knocked out, and were suitable for reuse. However, the problem remained of increasing the strength of the liquid mixture in its hardened state and this prevented the use of these liquid mixtures for making cores and molds of intricate shapes. Additionally, the scarcity and high cost of the hardening agent (hexavalent chromium compounds) made the cost of the mixture intolerably high.

SUMMARY OF THE INVENTION

An object of the present invention resides in the provision of a method of preparing a liquid self-hardening mixture, said method insuring the production of a mixture which is sufficiently strong in a hardened state and possesses sufficient refractory qualities for making castings of various alloys, which avoids the need for thermal drying, which is easy to knock out, and which allows the use of cheap and readily-available mineral binders.

Molding sand in the mixture, according to the invention, may consist of quartz sand, chrome magnesite and similar materials suitable for making foundry cores and molds.

In our fluid self-hardening mixture, use is made of a binder consisting of powdered hemihydrate of calcium sulfate ($\alpha$) which is produced by a known technique involving the dehydration of calcium sulfate dihydrate with saturated steam under pressure, followed by drying the dehydrated product and subjecting it to fine grinding. It is preferred to incorporate said binder into the present mixture to the extent of 8–15 parts by weight.

Our mixture moreover contains a lignosulfonic acid salt having a metal ion, or some other positive ion, or a mixture thereof. Calcium, sodium, and ammonium lignosulfonates or a mixture thereof are specifically useful for preparing the fluid mixture of the invention.

Waste sulfite-cellulose liquor, a by-product of cellulose manufacture from wood by the sulfite process, is an exemplary material containing said sulfonates. Said liquor may be used either in the liquid or the dry form, the content of lignosulfonic acid salts therein being in the 30 to 100% range. This material is designated hereinafter as waste sulfite-cellulose liquor.

To obtain said material in the dry form, waste sulfite-cellulose is evaporated, and the resultant solid product is subjected to heating at 170–180° C. for a period of 1.5–2 hours. Said heat treatment favors the condensation of lignosulfonate molecules and yields a material denoted as the thermopolymer of waste sulfite-cellulose liquor.

A lignosulfonic acid salt may be incorporated into the present fluid mixture in an amount of 0.1 to 2.0% by weight in the dry form or as an equivalent amount of waste cellulose-sulfite liquor.

In the fluid self-hardening mixture, according to the present invention, use is made of foaming agents selected from anionic, cationic or non-ionic surfactants, the preferred foaming agents being anionic surfactants such as, for example, alkylarylsulfonates, alkylsulfonates, and alkyl sulfates.

Alkylarylsulfonates of the general formula

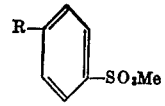

wherein R stands for a hydrocarbon radical, and Me is an alkali metal, preferably sodium, are synthesized or obtained from kerosene or gas-oil distillates by sulfonation with sulfur trioxide. This class of compounds is represented by refined alkylarylsulfonate (commercially available, for example as DC-PAC) isolated from oil-soluble sulfoacids, which result from sulfonating side chain cyclic hydrocarbons of kerosine fraction with sulfur trioxide. In DC-PAC, the alkyl radical R contains from 8 to 12 carbon atoms, while the aryl group contains 6 carbon atoms. An exemplary synthetic alkylarylsulfonate is sodium dodecylbenzenesulfonate (commercially available, for example, as Sulfanol), $C_{12}H_{25}C_6H_4SO_3Na$, and the sodium salt of a mixture of mono-, di- and tributyl-naphthalene sulfonic acids (commercially available, for example, as Nekal).

Other foaming agents, which may also be used for converting the present mixture to the fluid state, include primary and secondary alkyl sulfates of the general formula

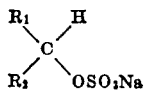

and alkylsulfonates, which are commercially available, for example, as "Mersolates" and generally consist of a mixture of primary $RSO_3Na$, and secondary

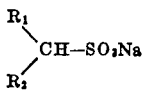

sodium alkylsulfonates.

It is preferred to add a foaming agent in an amount of 0.1 to 0.3 part by weight. The present fluid mixture may furthermore contain from 0.2 to 1.0 part by weight of portland cement which is an optional component.

DETAILED DESCRIPTION

The nature of the invention will become more fully apparent from a consideration of the following examples.

Example 1.—The mixture contains the following constituents (parts by weight):

| | |
|---|---|
| Filler (quartz sand) | 85.0 |
| Mineral binder (pulverulent calcium sulfate hemihydrate—α modification) | 15.0 |
| Salts of lignosulfonic acids (sulfite cellulose liquor) | 0.2 |
| Foaming agent DC-PAC (a Soviet-made refined-alkylarylsulphonate) | 0.15 |
| Water | 6.0 |

The mixture is prepared as follows. The dry materials (quartz sand and calcium sulfate hemihydrate) and stirred for 1 or 2 minutes; then a previously prepared liquid compound is added; this compound contains a foaming agent Na-alkylarylsulphonate, the salts of lignosulfonic acids, the sulphite-cellulose liquor, and water. Then stirring is continued for another 2 or 3 minutes until the mixture turns fluid and is considered ready for use.

Experimental tests have shown that the self-hardening liquid mixtures prepared by the above-described method feature the following properties:

Compressive strength—

| | Kg./cm.² |
|---|---|
| After 1 hr. of curing | 1.5–2.0 |
| After 24 hr. of curing | 7–9 |

Example 2.—The mixture contains the following constituents (parts by weight):

| | |
|---|---|
| Filler (quartz sand) | 87.5 |
| Mineral binder (α calcium sulfate hemihydrate) | 12.0 |
| Salts of lignosulfonic acids (sulphite-cellulose liquor) | 0.15 |
| Portland cement | 0.5 |
| Foaming agent DC-PAC (a Soviet-made refined alkylarylsulphonate) | 0.1 |
| Water | 5.0 |

The mixture of this composition features the following properties.

Compressive strength:

| | Kg./cm.² |
|---|---|
| After 1 hr. of curing | 2.5–4 |
| After 24 hr. of curing | 10–12 |

Simultaneous introduction of the salts of lignosulfonic acids and portland cement increases strength in a shorter period of time.

The self-hardening liquid mixtures prepared as described in the above examples, have a high permeability to gas (200 to 300 units), and can easily be knocked out after being run in with metal. The core boxes and patterns need not be covered with any separating coatings to prevent sticking of the mixture.

The liquid mixtures, produced according to the method disclosed herein, require no compaction for making cores and molds so that the latter are made by simply pouring the mixture into core boxes and onto patterns. The mixture hardens in air simultaneously throughout the entire volume of the core or mold. The cores and molds can be extracted 15 or 25 minutes after their forms have been filled with the liquid mixture. The mixtures prepared in accordance with the invention turn to a liquid state when their total moisture content is not over 6 percent, as a result of adding the foaming agents thereinto. Since the self-hardening liquid mixtures do not contain any free surplus water, they require no thermal drying and the process of hardening proceeds without the use of external factors.

While specific embodiments of the invention are disclosed in the above description, it will be obvious to those skilled in the art that various modifications and changes which do not deviate from the idea and scope of the invention, are possible. These changes and modifications are understood to fall within the scope of the invention if defined by the appended claims.

What is claimed is:

1. A method of producing foundry molds and cores which comprises preparing a mixture containing 85–92 parts by weight of foundry sand, 8–15 parts by weight of pulverulent calcium sulfate hemihydrate (α-modification), 0.1–2.0 parts by weight of a component selected from the group consisting of an alkali metal lignosulfonate, an alkaline earth metal lignosulfonate and ammonium lignosulfonate, and mixtures and polymers thereof, 0.1–0.3 parts by weight of a sulphate-containing surfactant foaming agent, and 5–7 parts by weight of water, forming cores and molds from said mixture, and allowing said cores and molds to harden in air.

2. A method as claimed in claim 1 wherein the foaming agent is a sodium alkylarylsulfonate.

3. A method as claimed in claim 1 wherein the lignosulfonate is waste sulfite-cellulose liquor.

4. A method as claimed in claim 1 which comprises preparing said mixture with 84–91.8 parts by weight of said foundry sand, and with 0.2–1.0 parts by weight of portland cement.

5. A method as claimed in claim 1 which comprises preparing a first premix consisting of 85–92 parts by weight of said foundry sand 8–15 parts by weight of said pulverulent calcium sulfate hemihydrate (α-modification); preparing a second premix consisting of 5–7 parts by weight of said water, 0.1–2.0 parts by weight of said component selected from the group consisting of an alkali metal lignosulfonate, an alkaline earth metal lignosulfonate and ammonium lignosulfonate, and mixtures and polymers thereof, and 0.1–0.3 parts by weight of said foaming agent; and preparing a mixture consisting of said first premix and said second premix in order to obtain a liquid mixture.

6. A method as claimed in claim 1 which comprises preparing a first premix consisting of 84–91.8 parts by weight of said foundry sand, 8–15 parts by weight of said pulverulent calcium sulfate hemihydrate (α-modification), and 0.2–1.0 part by weight of portland cement;

preparing a second premix consisting of 5-7 parts by weight of said water, 0.1-2.0 parts by weight of said component selected from the group consisting of an alkali metal lignosulfonate, an alkaline earth metal lignosulfonate and ammonium lignosulfonate, and mixtures and polymers thereof, and 0.1-0.3 part by weight of said foaming agent; and preparing a mixture consisting of said first premix and said second premix in order to obtain a liquid mixture.

7. A method as claimed in claim 2 wherein the sodium alkylarylsulfonate is a compound of the formula

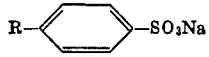

wherein R is an alkyl radical of 8 to 12 carbon atoms.

8. A method as claimed in claim 2 wherein the sodium alkylarylsulfonate is sodium dodecylbenzenesulfonate or the sodium salt of a mixture of butylnaphthalene sulfonic acids.

9. The product obtained by the process of claim 1.

References Cited
UNITED STATES PATENTS

| | | | |
|---|---|---|---|
| 2,288,736 | 7/1942 | Osserman | 106—111 |
| 2,529,835 | 11/1950 | Dailey et al. | 106—38.35 |
| 3,179,523 | 4/1965 | Moren | 106—38.35 |
| 3,317,327 | 5/1967 | Matsuda | 106—90 |
| 3,424,600 | 1/1969 | Lyass et al. | 106—38.35 |
| 3,436,236 | 4/1969 | Gamber et al. | 106—38.3 X |

LORENZO B. HAYES, Primary Examiner

U.S. Cl. X.R.

106—38.35, 38.5 R, 90, 98, 111